(12) United States Patent
Hsu et al.

(10) Patent No.: US 8,805,281 B2
(45) Date of Patent: Aug. 12, 2014

(54) CONTROLLING DEVICE FUNCTIONS OF A MOBILE TERMINAL IN A RESTRICTED AREA

(75) Inventors: Jay Hsu, Green Brook, NJ (US); Rodney Dale Regan, Somerville, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 206 days.

(21) Appl. No.: 13/408,520

(22) Filed: Feb. 29, 2012

(65) Prior Publication Data

US 2013/0225086 A1    Aug. 29, 2013

(51) Int. Cl.
*H04B 7/26*    (2006.01)

(52) U.S. Cl.
USPC ..... 455/41.3; 455/41.2; 455/90.3; 455/550.1; 455/556.2; 455/575.1; 455/411; 455/557; 370/338

(58) Field of Classification Search
USPC ........... 455/41.2, 41.3, 90.3, 550.1, 411, 435, 455/556.2, 557, 575.1, 414.1
See application file for complete search history.

(56) References Cited

U.S. PATENT DOCUMENTS

| | | | |
|---|---|---|---|
| 7,194,278 B1 | 3/2007 | Cook | |
| 7,492,777 B2* | 2/2009 | Ekberg et al. | 370/401 |
| 7,590,097 B2* | 9/2009 | Ekberg et al. | 370/338 |
| 8,204,649 B2* | 6/2012 | Zhou et al. | 701/36 |
| 8,284,748 B2* | 10/2012 | Borghei | 370/338 |
| 8,472,876 B1* | 6/2013 | Lee et al. | 455/41.2 |
| 8,502,642 B2* | 8/2013 | Vitito | 340/5.21 |
| 8,519,868 B2* | 8/2013 | Nadeem et al. | 340/933 |
| 2008/0268882 A1 | 10/2008 | Moloney | |
| 2011/0093161 A1 | 4/2011 | Zhou et al. | |
| 2011/0117903 A1 | 5/2011 | Bradley | |
| 2011/0281519 A1* | 11/2011 | Reuss et al. | 455/41.2 |
| 2013/0014232 A1* | 1/2013 | Louboutin et al. | 726/5 |

OTHER PUBLICATIONS

Application as filed including Specification, Claims, and Abstract for U.S. Appl. No. 12/787,997, filed May 26, 2010 entitled Systems and Method for Automating a Response from a Mobile Station.
Application as filed including Specification, Claims, and Abstract for U.S. Appl. No. 13/188,991, filed Jul. 22, 2011 entitled Automated Reply to Incoming Communications While in Motion.

* cited by examiner

*Primary Examiner* — Marceau Milord (57) ABSTRACT

A method performed by a mobile terminal includes receiving a device identifier from a short-distance-communication (SDC) device located outside of the mobile terminal by using the internal SDC device disposed in the mobile terminal and determining whether the received device identifier corresponds to or includes one of one or more identifiers stored in the mobile terminal. Upon determining that the received device identifier corresponds to one of the one or more stored identifiers, the mobile terminal performs a predetermined control function corresponding to the identifiers, without further receiving any instruction signal to control the phone function or the data communication function from the external SDC device.

26 Claims, 10 Drawing Sheets

| Entry | Name | Class | Manufacture |
|---|---|---|---|
| 1 | CAR | 2 | ABC |
| 2 | MY PC | 1 | XYZ |
| 3 | | | |

Fig. 4A

| Entry | Name | Class | Control Function |
|---|---|---|---|
| 1 | CAR | 2 | Suppress Phone |
| 2 | CAR2 | 2 | Suppress data communication |
| 3 | CAR3 | 3 | Turn off phone |

| Entry | Name | Class | Priority | Control Function |
|---|---|---|---|---|
| 1 | ROOM01-1 | 2 | 2 | Enter vibration mode |
| 2 | ROOM01-2 | 2 | 1 | Disable phone and data communication |
| 3 | | | | |

CONTROLLING DEVICE FUNCTIONS OF A MOBILE TERMINAL IN A RESTRICTED AREA

BACKGROUND

There is increasing concern about the dangers of distracted driving due to use of a mobile terminal by drivers. Many states limit the use of the mobile terminal while driving. For example, several states prohibit drivers from any handheld use of cell phones while driving. Visual message functions, such as texting may be prohibited. Although no state bans all cell phone use (handheld and hands-free) for all drivers, some states prohibit all cell phone use by certain drivers, for example, by novice drivers or by school bus drivers when passengers are present. However, most recently, it has been proposed to ban even the use of a hands-free phone while driving.

The use of mobile terminals is also prohibited in some restricted places, for example, in courts while in session, in security areas such as immigration booths at airports, or certain areas in hospitals. Although people in such places are required to turn off their mobile terminals or not to use the mobile terminals, some people ignore this and use their mobile terminals anyway.

Accordingly, there is a need to control or suppress voice and data communications of the mobile terminal while driving or while the user is in a restricted area.

BRIEF DESCRIPTION OF DRAWINGS

The drawing figures depict one or more implementations by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In the examples below, a control program in a mobile terminal controls functionality of the mobile terminal in response to information of a device identifier (e.g., device name, specific information contained in the identifier) assigned to an external short-distance-communication (SDC) device discovered by or connected with the mobile terminal.

The mobile terminal includes a wireless communication interface, for example, for mobile wireless communications via public or "macro" mobile communication networks, such as one of those operated by various cellular service providers. The wireless communication interface supports communications with a base station of such a network over distances that may extend to as much as a half to several miles or even more. The mobile terminal also includes an SDC device. This latter device provides shorter range wireless communications than provided with the macro network via the wireless communication interface. The control methodology herein is applicable to terminals and external equipment that use various kinds of SDC communication technologies. Examples include various technologies of Bluetooth® and WiFi®. As compared to the longer range capability of the wireless communication interface, the SDC technology supports communications in ranges of tens of feet to a few hundred feet.

Via programming of other techniques, the mobile terminal is configured to perform control functions to restrict or limit the operability of certain otherwise regular functions of the mobile terminal. For example, the terminal may be configured to limit volume or even turn off audible and/or vibratory alerts. As another example, the terminal may be configured to disable the user interface or some or all communications to/from the terminal.

An external SDC device located outside of the mobile terminal has an assigned device identifier, which the external SDC broadcasts as a beacon or the like. With the techniques discussed below, the mobile terminal control functions to limit the terminal operability are responsive to detection of the device identifier or information contained in the device identifier received from the external SDC.

In operation, the SDC device within the mobile terminal acquires a device identifier of an external SDC device, for example, when the mobile terminal comes within communication range of the external SDC device. The mobile terminal determines whether the received device identifier and/or information in the received device identifier corresponds to an identifier or specific information stored in the mobile terminal in association with a control function; and if so, the mobile terminal ascertains the associated control function. In response, the terminal executes the control function, to limit or restrict operation/functionality of the mobile terminal.

Figure 1:
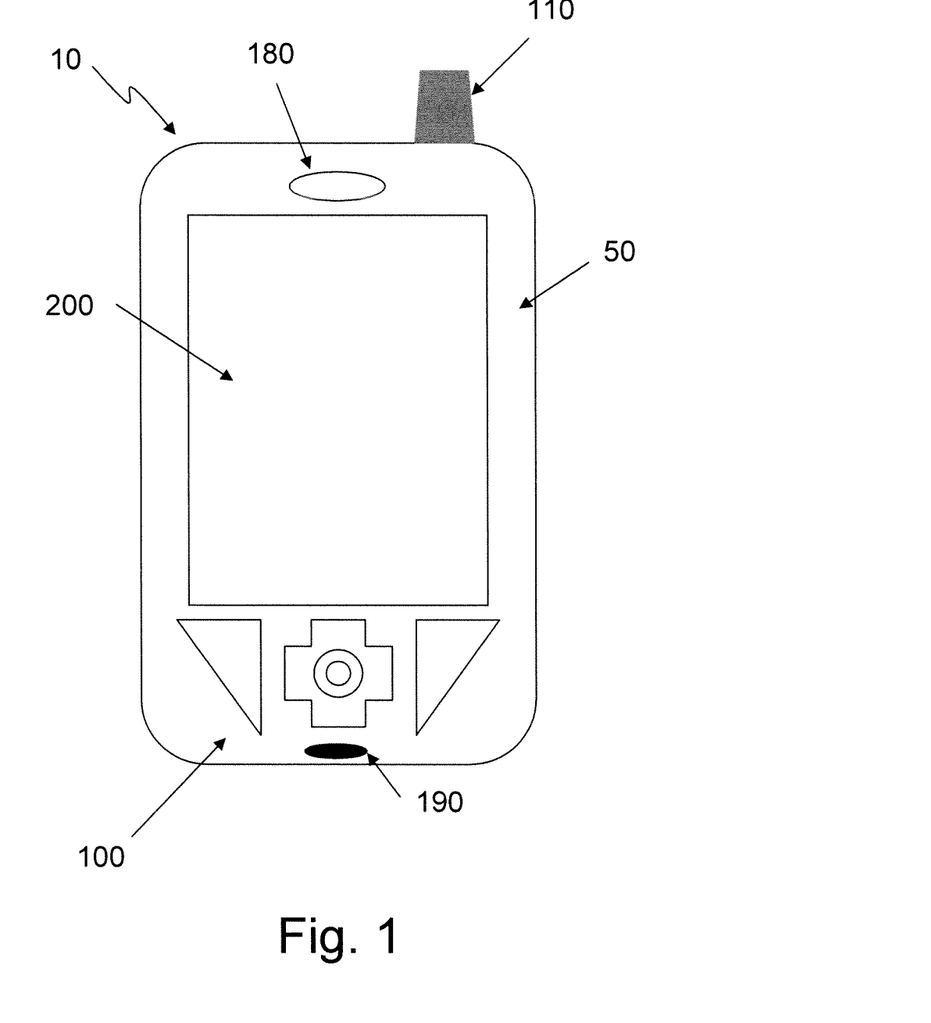
FIG. 1 shows an example of a mobile terminal.

FIG. 1 shows an example of a mobile terminal 10. In this example, a smart phone having a touch screen is shown; although other types of mobile devices, such as personal digital assistances (PDAs) and feature phones and e-readers and tablet computers may be used. The mobile terminal 10 includes a main body 50, one or more input devices 100 such as keys, joystick, tack ball, etc, antenna 110, a speaker 180, a microphone 190 and a touch panel display 200. When the mobile terminal 10 is fully configured to be touch-sensitive, the input device(s) 100 may not be separately provided from the touch panel display 200. The configuration of these elements is not limited to the arrangement shown in FIG. 1. Similarly, other unshown elements may be present.

As shown below, the mobile terminal 10 may be configured to perform the functions described herein, among others. The mobile terminal 10 includes a memory storing a control program, and the control program, when executed by a processor, causes the processor to configure the mobile terminal to perform these functions. Such a control program may be pre-installed in the mobile terminal 10 or may be installed by, for example, downloading the program from the Internet. The control program may be running whenever the mobile terminal 10 operates, to detect and respond to the SDC identifier in the various ways discussed herein. Alternatively, such a control program may be triggered by an event such as detection of SDCs or a user input. The mobile terminal may alternatively utilize special purpose hardware configured to perform the relevant functions.

Figure 2:
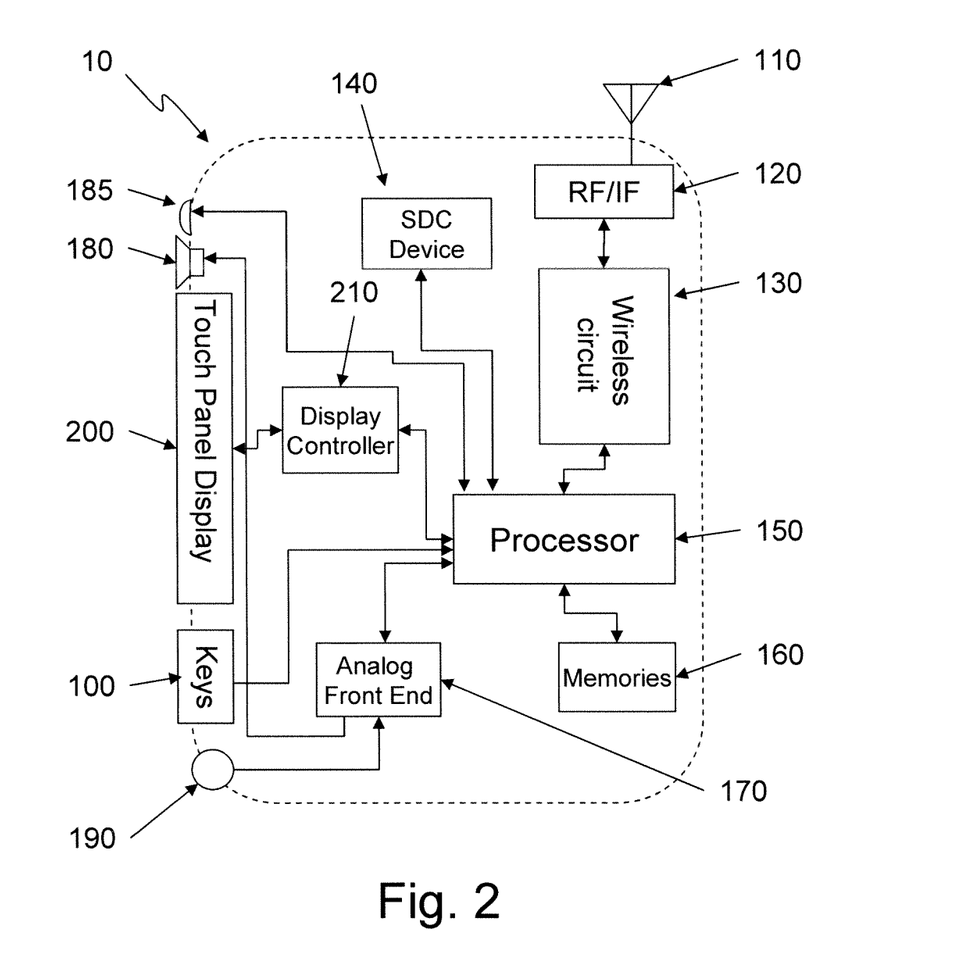
FIG. 2 shows an exemplary block diagram of elements of the mobile terminal of FIG. 1.

FIG. 2 shows an exemplary block diagram of elements of the mobile terminal 10 of FIG. 1. The mobile terminal 10 has a wireless interface circuit including an RF interface 120 connected to the antenna 110, a wireless circuit (e.g., analog and/or digital base band processor) 130 connected to one or more processors 150. The wireless interface circuit is utilized for phone and data communications such as texting or sending/receiving email via a macro wireless communication network. A display controller or driver 210 is connected to the touch panel display 200 and the processor 150 for controlling the touch panel display 200. An analog front end processor 170 is connected to the processor 150 for controlling the speaker 180 and the microphone 190. A short-distance-communication (SDC) device 140 is also coupled to the processor 150. The processor 150 is configured to control the display controller 210, the RF interface 120, wireless circuit 130, the SDC device 140 and the analog front end processor 170. The processor 150 also connects to one or more memories 160. The memory 160 may include, for example, a RAM, a ROM or a flash memory. The memory 160 stores a control program that, when executed by the processor 150, causes the mobile terminal 10 to perform one or more of the control functions specified in the control program. The mobile terminal 10 may further include a camera 185 for taking a picture or a movie. For purposes of the present discussion, the control program in memory 160 will include programs for controlling mobile terminal operations in response to a device identifier obtained from an external SDC device. The memory 160 may also store data or a table used as part of such control.

The SDC device 140 may be configured in accordance with IEEE (Institute of Electrical and Electronics Engineers) 802.15 standards. One example of such an SDC device 140 is a Bluetooth® device configured in accordance with the IEEE 802.15.1 standard. Bluetooth® is known as proprietary open wireless technology standard for exchanging data over short distances (using short wavelength radio transmissions in the 2400-2480 MHz range) from fixed and mobile devices. The SDC device may be a wireless device for a local area network (LAN) (e.g., Wi-Fi® network). For example, the wireless LAN device may be configured according to the IEEE 802.11.

As noted, the control methodology may be implemented with various kinds of SDC communication technologies, such as Bluetooth® or WiFi®. Some mobile terminals 10 may actually have SDC devices for both Bluetooth® and WiFi®.

Some examples discussed in more detail later involve configuration of the mobile terminal 10 to recognize and link with a particular external SDC device, whereas other examples do not rely on pre-configuration of the mobile terminal to establish a link with the external SDC device. Bluetooth® utilizes a "pairing" procedure to configure devices to recognize and communicate with each other. With Bluetooth®, once the SDC device 140 within the mobile terminal 10 is paired with the external SDC device, the two will discover and recognize each other when they later come within range of each other and will automatically establish a communication link. Similarly, with WiFi, a mobile terminal with a WiFi SDC device may be programmed with the key for a particular wireless access point type WiFi SDC device; and thereafter, when the mobile terminal comes within range of the wireless access point, the two SDC devices will automatically establish a communication link. With both Bluetooth® and WiFi® examples, the external SDC device broadcasts a signal that carries a device identifier. The device identifier is used as part of the recognition and link initialization processes. In the present examples, information of the device identifier is also used to control operability, e.g. to limit or restrict one or more functions, of the mobile terminal 10.

Figure 3:
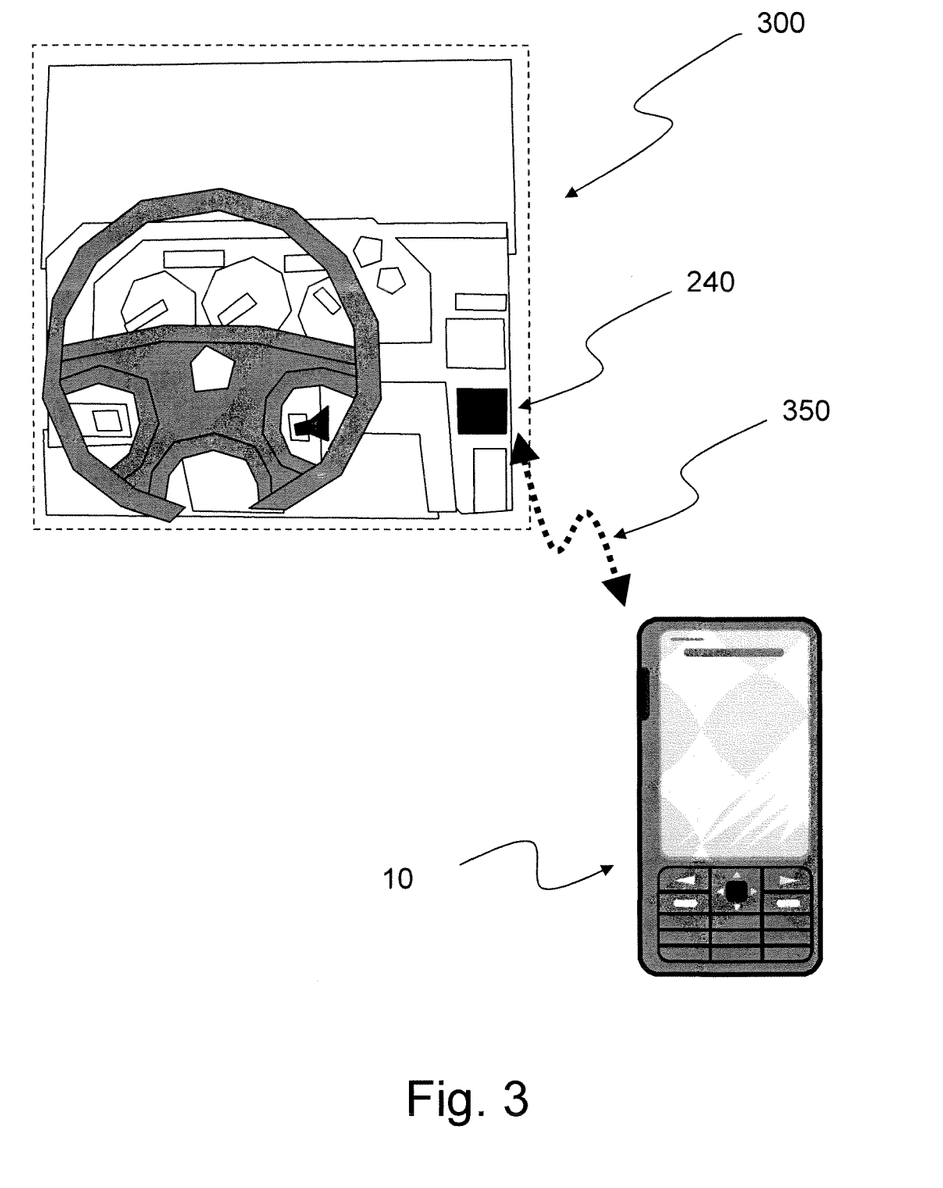
FIG. 3 shows a schematic diagram illustrating first example of application of the controlling a mobile terminal based on a short distance communication (SDC) identifier.

In a first example, the use of voice and/or data communication (e.g., texting and email) of the mobile terminal 10 is restricted while a vehicle is in operation. FIG. 3 shows a schematic diagram illustrating the first example. In this example, a mobile terminal 10 of a driver of a vehicle 300 may communicate with an external SDC device 240 installed inside the vehicle 300 via a short distance communication link 350.

Recently, many vehicles, e.g., passenger cars, have come equipped with an SDC device 240 (e.g., a Bluetooth® device). Such an SDC device 240 may be installed inside an instrument panel of the vehicle or connected to an On-Board-Diagnostic (OBD) port or a car electric recharge plug. In the example, the vehicle 300 is equipped with the SDC device 240 as a pre-installed device. If the vehicle 300 is not equipped with an SDC device, an add-on SDC device may be utilized. The add-on SDC device may be connectable to a cigar lighter socket or an OBD port of the vehicle 300 to receive electric power from the vehicle. Similar to the vehicle SDC device 240, the add-on SDC device may be paired with the SDC device 140 of the mobile terminal 10; and the device name of the add-on SDC device may be utilized to control the functionality of the mobile terminal 10.

The SDC device 240 is assigned a device name by, for example, a manufacture of the SDC device or the vehicle. The name is generally a human recognizable name including one or more alphabetic characters and/or numbers. In this example, the SDC device 240 has "CAR" as the device name. If the SDC devices 140, 240 are Bluetooth® devices, the SDC devices 140, 240 are paired to allow communications to occur between the SDC devices 140, 240.

For pairing, the mobile terminal 10 may execute a relevant portion of the control program. The program execution controls terminal transmission of SDC identifiers and processing of received SDC identifiers. If appropriate, the program may also cause the terminal to display information to a user and/or process relevant user inputs. The control program may alternately call embedded software in the SDC device 140 or software provided with the SDC device 140 to activate the pairing process. Further, the pairing process may be independently performed by the embedded software in the SDC device 140 or the software provided with the SDC device 140. In such a case, after the pairing process by such software, the terminal control program according to this example may be executed.

Figure 5:
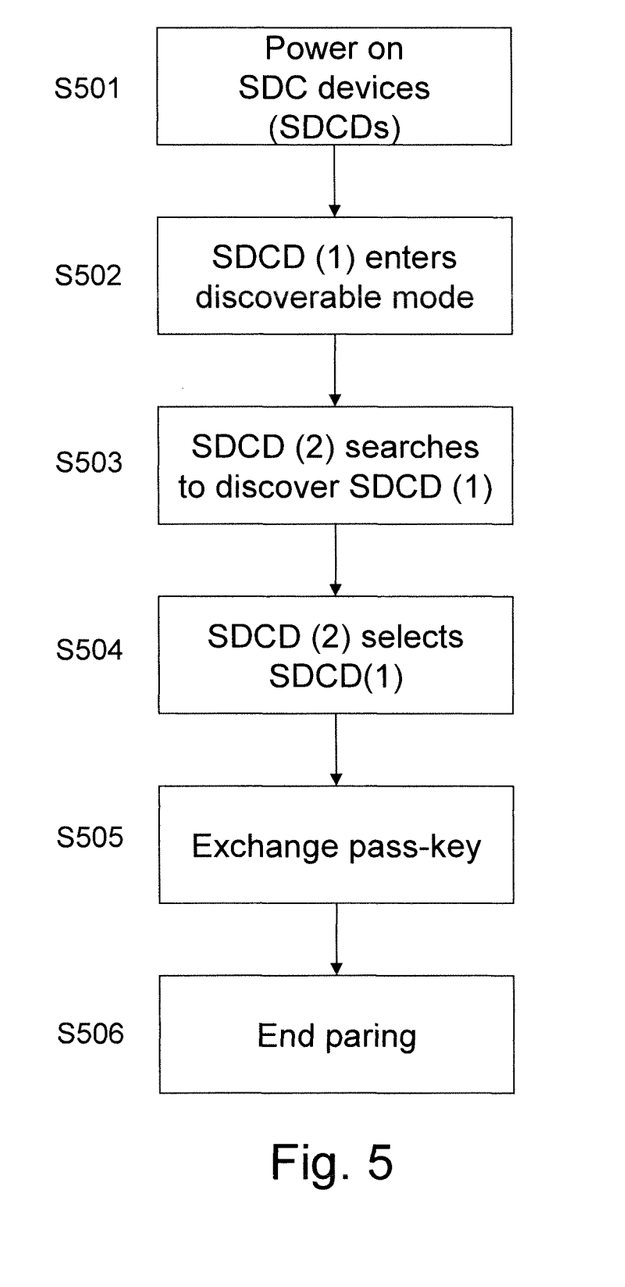
FIG. 5 shows an exemplary flow of a pairing process.

FIG. 5 shows an exemplary flow of the pairing process. After the mobile terminal 10 with the SDC device 10 is powered on (S501), one of the SDC device 140 and the SDC device 240 is set in a "discoverable" state. In another example, the SDC device 140 may be powered on separately from the mobile terminal 10 after the mobile terminal 10 is powered on. The user of the mobile terminal 10 (who also will be the driver of the vehicle 300) activates the SDC device 140 of the mobile terminal 10 by executing the applicable programming (S502).

The user activates the electrical system of the vehicle 300, e.g., by turning an ignition key of the vehicle 300 to an "ON" position or an "ACCESSORY" position, pushing a start button of the vehicle 300 or activating the vehicle 300 remotely. When the electrical system is turned on, the SDC device 240 is powered on (S501).

Upon being powered on, the SDC device 240 of the vehicle 300 may be set to the "discoverable" mode (S502). An SDC device in the discoverable mode may transmit a beacon on a designated channel, which may contain, for example, a device name, a device class (defining maximum power output) and/or technical information (e.g., device features, manufacturer, etc.).

Figure 4A:
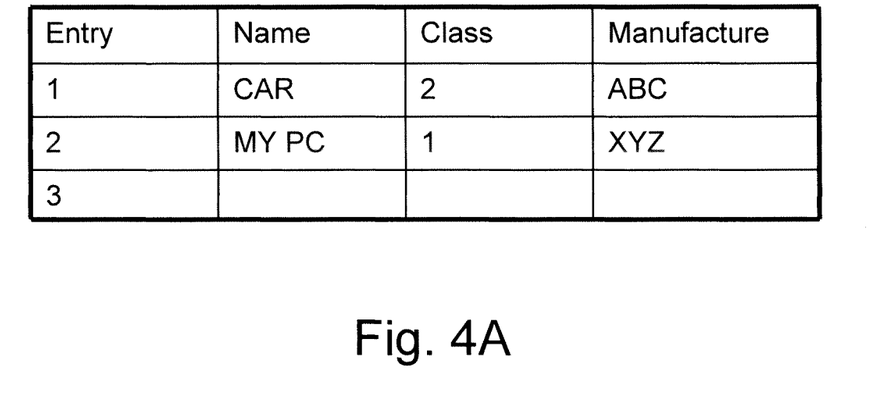
FIG. 4A shows an exemplary display of a list of discovered SDC devices.

If the mobile terminal 10 has not previously been paired with the SDC device 240 (or if automatic pairing is not desired), the user may operate the mobile terminal 10 to "discover" the SDC device 240 or the mobile terminal 10 may automatically find "discoverable" devices (S503). For example, as shown in FIG. 4A, a list of "discoverable" devices is displayed on the display 200. If there is more than one "discoverable" device, the display 200 may display all of the "discoverable" devices recognized by the mobile terminal 10. In the example of FIG. 4A, another SDC device "MY PC" is discovered as well as the SDC device 240 of the vehicle 300.

The process continues by a desired name from the list being selected either manually by the user or automatically (S504). In our example, the user selects the name "CAR" of the SDC device 240 installed in the vehicle 300. Then, if authentication is required, the user may input a pass-key as an authentication key and the SDC device 140 exchanges the pass-key with the SDC device 240 (S505). For some SDC devices, a default pass-key stored in the SDC device may be used rather than the user entering the pass-key. Once the pass-key is exchanged between the SDC device 140 and the SDC device 240, the pairing between the SDC device 140 and SDC device 240 has been established (S506). Once the pairing has been established, the SDC device 140 and SDC device 240 may automatically establish a communication link 350 between the SDC device 140 and the SDC device 240 when both devices are within communication range of each other. In one example, the SDC devices 140, 240 automatically establish communication when the mobile terminal 10 is subsequently brought back into the vehicle 300.

When the SDC devices 140, 240 are first paired, upon selecting the name of the SDC device 240, the user may be prompted to enter or select a control function to be associated with the name of the SDC device 240. The available control functions may include, for example, "suppress voice communications," "enter silent mode," "suppress data communications," "disable camera functions" etc. so that control of some or all of the regular functions of the mobile terminal 10 is activated and, as a result the user may be unable to receive communications or use certain functionality of the mobile terminal 10 while operating the vehicle 300. The control program may cause the mobile terminal 10 to provide a list of predetermined control functions associated with, for example, communications to the mobile terminal 10 and permit the user to individually select one or more of the control functions in association with the selected name. The selected function(s) and the device name are stored in the memory 160, e.g. as registration information. In one example, "enter silent mode" is selected as the control function and assigned to the named SDC device, "CAR." In the silent mode, when the mobile terminal 10 receives a communication such as a phone call, audible reaction to the phone call by the mobile terminal is suppressed as are, optionally, vibrational responses.

Figure 4B:
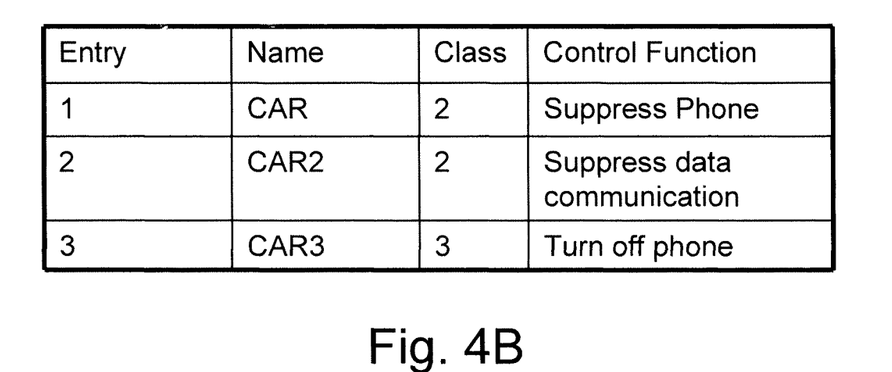
FIG. 4B shows an example of a table stored in the mobile terminal.

If the user possesses two or more vehicles, the user may repeat the pairing process and function selection associated with the second vehicle. In such a case, the memory 160 may store the selected device names and associated control function(s) in the form of a table as shown in FIG. 4B. In FIG. 4B, the device names of three vehicles are registered with the associated predetermined control functions, respectively.

When the pairing process finishes, the user may subsequently operate the vehicle 300 or leave and later operate the vehicle 300. In addition, other SDC devices may be paired with the SDC device 240 in the vehicle 300.

Figure 6A:
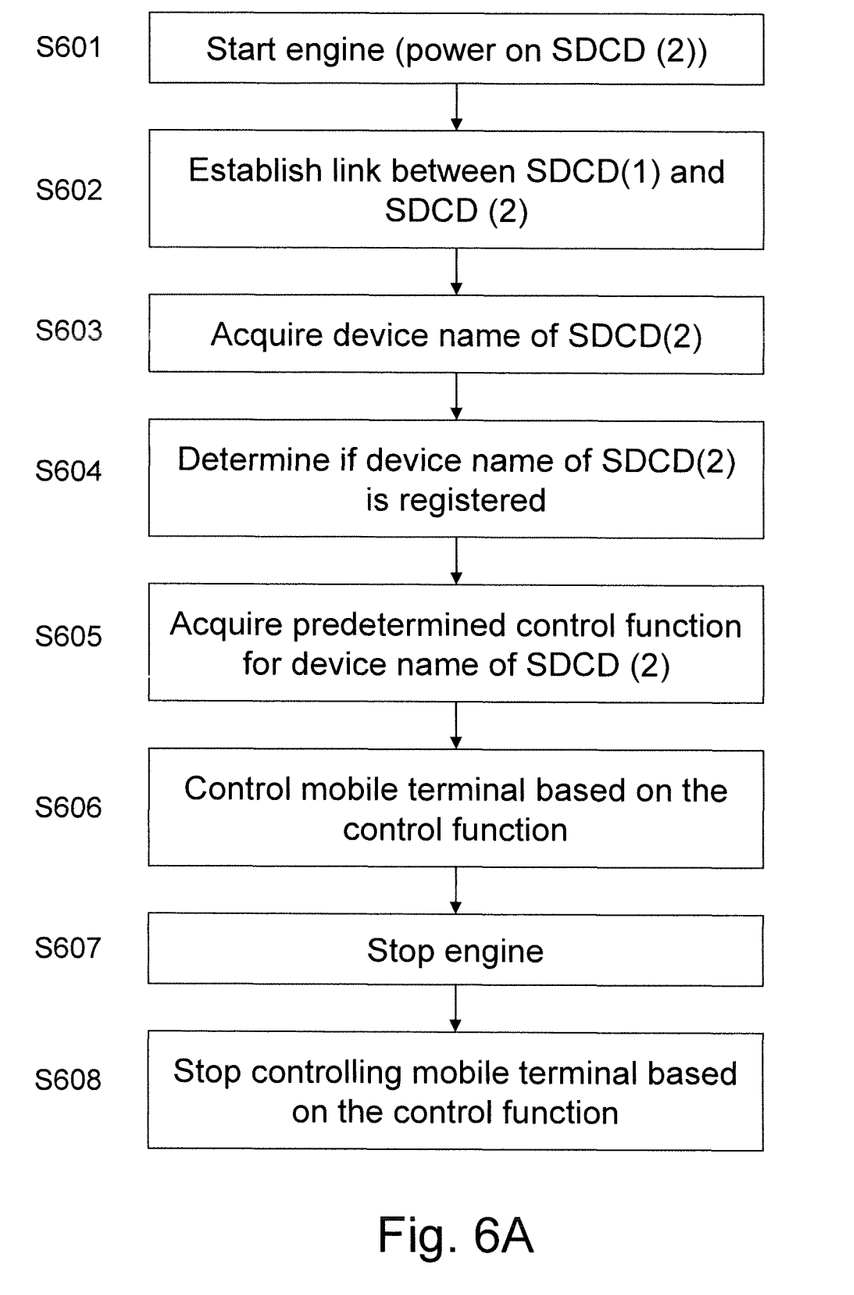
FIG. 6A shows an exemplary flow of controlling functionality of the mobile terminal based on the identifier of an SDC device.

FIG. 6A shows an exemplary flow of controlling functionality of the mobile terminal 10 according to the first example. The user who carries the mobile terminal 10 enters the vehicle 300 and starts the engine for driving (or otherwise activates the electrical system of the vehicle 300) (S601). At this time, the control program is running on the mobile terminal 10 and the SDC device 140 is active for communication. The control program may be activated by the user (driver) manually before operating the vehicle 300 or may be automatically executed as a resident program on the mobile terminal 10 upon being powered on or upon new detection of an SDC beacon by the SDC device 140.

When the user activates the electrical system of the vehicle 300, power is supplied to the previously dormant vehicle SDC device 240, permitting communication with another SDC device. The SDC device 140 of the mobile terminal searches for discoverable SDC devices near the SDC device 140 and finds the vehicle SDC device 240. In one embodiment, the mobile terminal 10 stores the registration information of the paired SDC device 140, allowing the SDC device 140 and the vehicle SDC device 240 to automatically establish a communication link 350 (S602). Upon establishing the communication link 350, the SDC device 140 and the vehicle SDC device 240 acquire the respective device names (S603). In other embodiments, the communication link 350 may not be established—as long as the SDC device 140 finds the vehicle SDC device 240 and acquires the device name of the vehicle SDC device 240, the control program can control the functionality of the mobile terminal 10.

The control program of the mobile terminal 10 then determines if the device name of the SDC device 240 with which the communication link 350 is being or has been established is listed in the stored registration information (S604).

Upon determining that the device name of the vehicle SDC device 240 is listed in the registration information, the control program causes the mobile terminal to perform the corresponding control function (S605), e.g., to limit or restrict operability of the mobile terminal 10. In the present example, the control program causes the mobile terminal 10 to enter a "silent mode." In this silent mode, when the mobile terminal 10 receives a phone call or message, the mobile terminal 10 does not indicate that a communication has been received—e.g., either sound indicating the presence of the communication is suppressed or both sound and vibration are suppressed. The user may thus be unaware of receiving the communication while the vehicle SDC device 240 is connected with the SDC device 140 of the mobile terminal 10 due to the lack of indication by the mobile terminal 10, thereby effectively preventing the user from employing the mobile terminal 10 for incoming communications while driving the vehicle 300.

When the user turns off the electrical system of the vehicle 300 or leaves the vehicle (S607), the communication link between the SDC device 140 and the SDC device 240 is lost. When mobile terminal 10 detects that the link is lost, the control program automatically cancels the "silent mode" and causes the mobile terminal 10 to return to a normal mode so that the mobile terminal 10 is able to provide an audible reaction to receiving a communication (S608). In another embodiment, the control program may allow the user to manually alter the state of the mobile terminal 10 to return to the normal mode by, for example, inputting a predetermined pass code.

In another example, when the mobile terminal 10 receives a communication while in the silent mode activated by the control program, the control program may cause the mobile terminal 10 to send a message to the originator of the communication (e.g., for a phone call, to a caller). The message may be an audio message or a text message notifying the originator that the user of the mobile terminal 10 is presently driving and cannot reply. In addition or in the alternative, if a phone call is received, the control program may prompt the caller to leave a message for the user of the mobile terminal 10, and if the caller leaves a message, the control program may cause the mobile terminal 10 to record the message and/or to indicate that a message is present on a voicemail server to which the user of the mobile terminal 10 has access and that is associated with the mobile terminal 10 (all without notifying the user while the vehicle is in operation).

Note that the vehicle SDC device 240 need not be configured to transmit a specific control signal to control the functionality of the mobile terminal 10. This control may be provided solely by the control program resident in the mobile terminal 10. In this example, control of the functionality of the mobile terminal 10 is effected only by the mobile terminal 10 and only after the name of the vehicle SDC device 240 is recognized by the mobile terminal 10.

In the above example, the SDC device 140 and the vehicle side SDC device 240 are paired. In another example, the control program of the mobile terminal 10 may control the functionality of the mobile terminal 10 without pairing occurring. When the SDC device 240 is installed in the vehicle 300, the SDC device 240 may have a device name with specific information that indicates the SDC device is installed in a vehicle. For example, the device name of such an SDC device includes a specific extension such as ".CAR" or ".VEHICLE" at the end of the device name. The specific information may be a number with one or more digits, or may be a part of the device name. With this approach, the control program in the mobile terminal 10 may be pre-configured to implement a corresponding control function with respect to each device associated extension, so that whenever a device with specific information is detected, the functionality of the mobile terminal 10 is limited or restricted by the control program in the indicated corresponding manner, whether or not the mobile terminal 10 is paired with the other SDC device. For example, the specific information ".CAR" is associated with the control function of "disable phone and data communication functions" without user interaction with the mobile terminal 10 to establish or store this association. For example, such specific information and the associated control function may be pre-installed by a manufacturer of the mobile terminal together with the control program, either as a list or table embedded in the program or stored separately from the program but accessible during execution of the program. As another example, the corresponding control functionalities could be implemented by code of the program defining the logic of the program execution to implement the control functions corresponding to respective extensions.

Figure 6B:
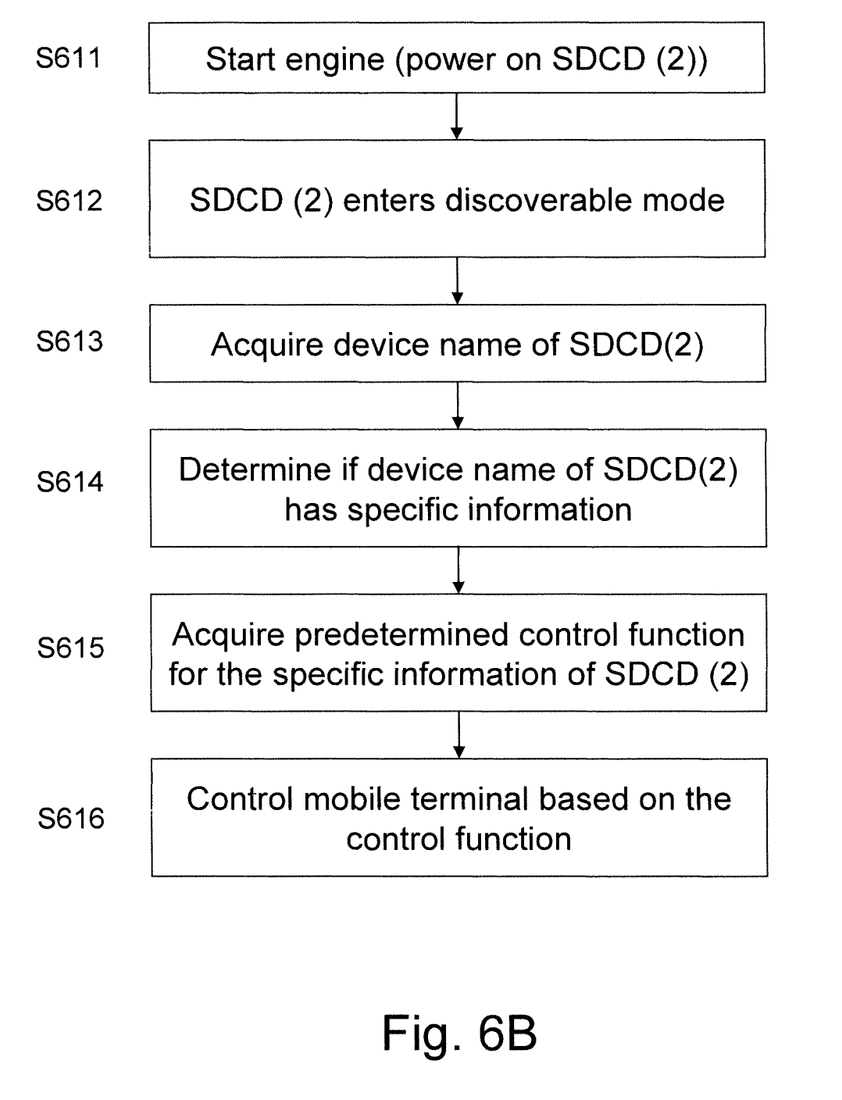
FIG. 6B shows an exemplary flow of controlling functionality of the mobile terminal based on the identifier of an SDC device.

FIG. 6B shows an exemplary flow of controlling function of the mobile terminal 10 according to the above example. A user of the mobile terminal 10 with the control program running thereon enters a vehicle. The vehicle has installed therein a vehicle SDC device having a device name, for example "MYAUTO.CAR." The device name contains specific information (.CAR), which is associated with a particular functionality of the mobile terminal 10. This association is stored in the mobile terminal 10 for use by the control program. Upon activating the electrical system (e.g., by turning on the engine) (S611), the vehicle SDC device 240 enters a "discoverable mode" (S612). The SDC device 140 of the mobile terminal 10 can subsequently "discover" the vehicle SDC device 240.

At this time, the SDC device 140 acquires the device name of the vehicle SDC device 240 (S613) and determines whether or not the device name of the discovered SDC device contains the specific information (S614). In this example, the SDC device 140 determines that the vehicle SDC device 240 has the device name "MYAUTO.CAR" and thus the device name has the extension ".CAR." The control program of the mobile terminal 10 ascertains the control function associated with the extension ".CAR" (S615) and performs the predetermined control function (S616) to set the operability of the mobile terminal 10. In different examples, the control program may disable announcements of the reception of phone and data communications or may disable the phone and data communications to and/or from the mobile terminal 10.

Accordingly, when the control program initially associates the specific information with setting particular functionality of the mobile terminal, the functionality of the mobile terminal may be automatically altered in any vehicle irrespective of having been previously paired with the particular SDC device in the vehicle. As above, the vehicle SDC device need not be configured to transmit a specific control signal to control the mobile terminal 10 as the control program is resident in the mobile terminal 10. In such a case, control of the functionality of the mobile terminal 10 is established by the mobile terminal 10 based only upon acquiring a specific device name (e.g., the extension indicated).

Figure 7:
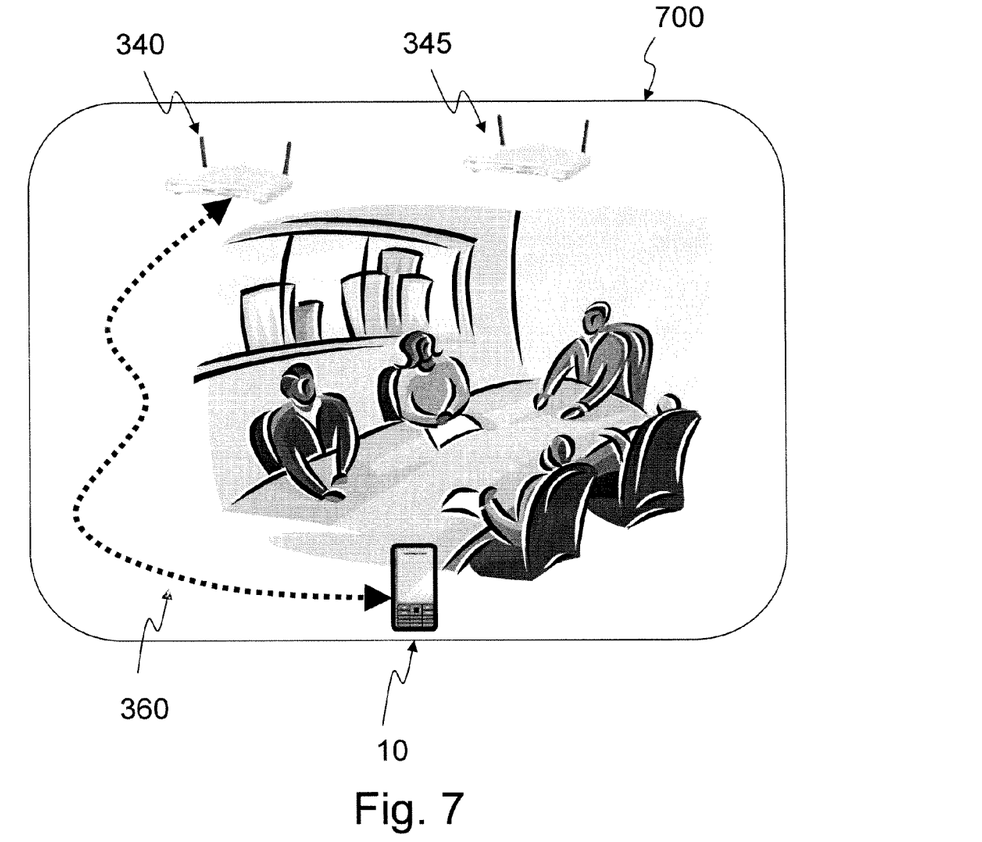
FIG. 7 shows a schematic diagram illustrating another application example.

Up to this point, the discussion has focused on examples that apply to the functionality restrictions in relation to vehicles that mobile terminal user may operate. However, vehicular restrictions are only one example in which controlling the functionality of the mobile terminal may be useful. In another example, the functionality of the mobile terminal may be controlled in a restricted area, for example, a court while in session, meetings, security areas such as immigration booths at airports, or hospitals. FIG. 7 shows a schematic diagram illustrating such an example of a restricted area application.

In this example, a mobile terminal 10 of a meeting participant may communicate with an SDC device 340 installed inside or near a restricted area (as shown meeting room 700) via a short distance communication link 360 such as Bluetooth®. The SDC device 340 may have a device name such as "ROOM01-1." In addition, the meeting room 700 may have an additional SDC device 345 having a device name such as "ROOM01-2" servicing the meeting room 700.

Figure 8:
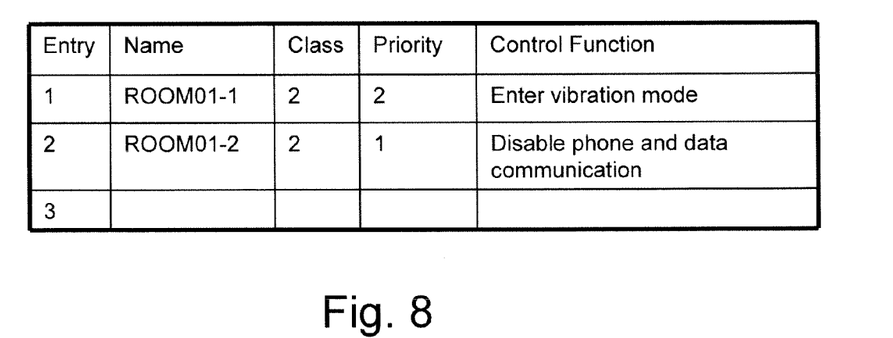
FIG. 8 shows an example of a table stored in the mobile terminal.

Similar to the foregoing example, the SDC device 140 of the mobile terminal 10 and first and second room SDC devices 340 and 345 are paired (in a manner substantially the same as that shown in FIG. 5) before communication is permitted between the devices. In the present example, however, different predetermined control functions may be assigned to the first room SDC device 340 and the second room SDC device 345. For example, the control function "enter vibration mode" may be assigned to the device name "ROOM01-1" of the first room SDC device 340 and the control function "disable phone and data communication functions" may be assigned to the device name "ROOM01-2" of the second room SDC device 345. The mobile terminal 10 may store the pairing results as a table as shown in FIG. 8. The pairing process may be performed on mobile terminals of the people (e.g., employees) who may be expected to use the meeting room 700. This permits the functionality of the mobile terminal to be controlled such that different operational modes are established for the mobile terminal, depending on the purpose or nature of a meeting held in the meeting room 700, by changing which of the room SDC devices is discoverable (and/or pairable to). The above example provides alteration of device operation (e.g., automatic suppression) based only on the discovered/paired room SDC devices without user interaction (other than the pairing process).

Figure 9A:
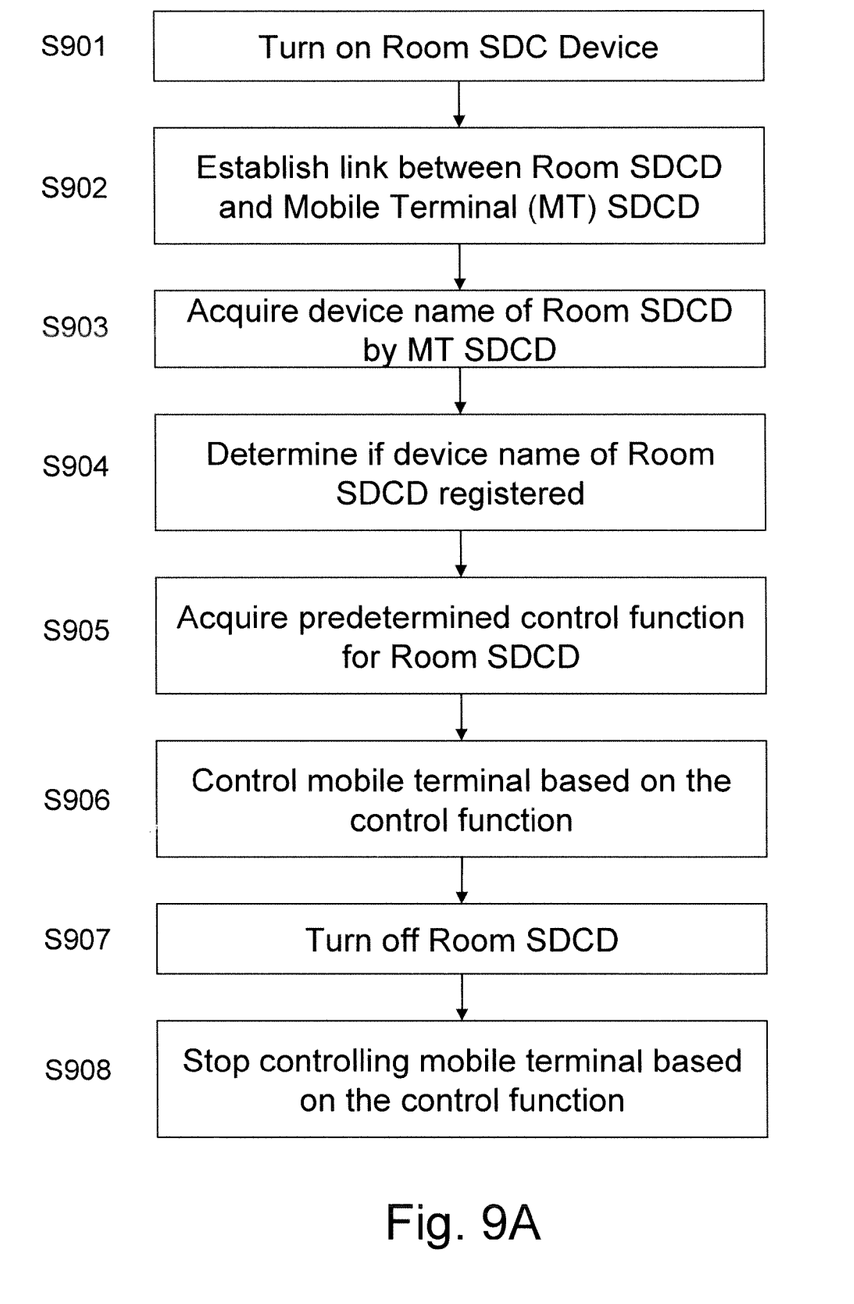
FIG. 9A shows an exemplary flow of controlling functionality of the mobile terminal based on the identifier of an SDC device.

FIG. 9A shows an exemplary flow of the control program controlling the mobile terminal 10. In a casual meeting, a meeting organizer may turn on the first room SDC device 340 and turn off the second room SDC device 345 (S901). Under this setting, when a meeting participant carrying the mobile terminal 10 enters the meeting room 700, the mobile terminal 10 of the participant establishes a communication link 360 with the first room SDC device 340 (S902). Alternatively, as above, mere discovery of the SDC devices available rather than establishment of the communication link may be sufficient, i.e., as long as the SDC device 140 finds the first room SDC device 340 and acquires the device name of the first room SDC device 340, the control program can appropriately control the functionality of the mobile terminal 10.

The mobile terminal 10 of the participant acquires the device name "ROOM01-01" of the first room SDC device 340 (S903). The mobile terminal 10 then determines if the acquired device name is registered in the mobile terminal 10 (S904). Upon determining that the device name is registered, the mobile terminal 10 ascertains the predetermined control function associated with the acquired device name "ROOM01-01" (S905) and subsequently executes the predetermined control function (S906) associated with the acquired name in the registration information. In this example, the mobile terminal 10 enters "a vibration mode" when the meeting participant enters the meeting room 700 (and the above steps occur). Since the mobile terminals of the participants are put in vibration mode, the participants may be able to receive a phone call, and be able to answer the call, for example, outside of the meeting room 700. Accordingly, it is possible for the meeting participants to receive important phone calls during the meeting, while preventing their mobile terminals from audibly reacting to such phone calls and disturbing the meeting. At the end of the meeting or at a break of the meeting, the meeting organizer may turn off the first room SDC device 340 (S907) so that the mobile terminals of the meeting participants may return to a normal operation mode (S908). Returning to the normal operating mode can be accomplished by the organizer turning on a room SDC device in which when the mobile terminals communicate using this room SDC device, the operability of the mobile terminals is unrestricted, or by permitting the mobile terminals to communicate through systems that do not employ the room SDC devices (e.g., without using Bluetooth® and/or WiFi®).

If the meeting is important, a meeting organizer may turn off the first room SDC device 340 and turn on the second room SDC device 345. As the second room SDC device 345 has previously been associated with the control function of disabling the phone and data communications of the mobile terminals of the meeting participants, the mobile terminals of the meeting participants are automatically set to this end when they enter the meeting room 700 (and the above steps occur). Accordingly, it is possible to prevent the mobile terminals from indicating that a communication has been received and prevent outgoing communications during a meeting, thereby allowing the meeting participants to concentrate on the meeting. As in the previous examples, the room SDC devices 340 and 345 may not be configured to transmit a specific control signal to control the mobile terminal 10—acquisition of the device name may be sufficient to limit the functionality of the mobile terminal 10.

Although, the SDC devices 140, 340, 345 have been described as Bluetooth® devices, the SDC devices 140, 340, 345 may be other wireless communication devices, such as wireless devices enabling local area network (LAN) communications. In this latter case, the SDC devices 340, 345 may be a host or a router that provides a wireless connection point, and that has a service set identifier (SSID) as the device name. For example, the SDC device 340 may have "ROOM01-1" and the SDC device 345 may have "ROOM01-2" as the SSIDs. When the SDC devices are wireless LAN devices, the Bluetooth® pairing process set forth above does not occur. Instead, the mobile terminal 10 may be set to establish LAN-based communication with the room SDC devices. If the room SDC devices request a key or pass code, the user of the mobile terminal 10 may input the key or pass code for the mobile terminal 10 to communicate with the room SDC. Similar to the above example for Bluetooth® devices, the corresponding predetermined control functions are also set in the mobile terminal 10 in association with the SSID or the relevant information from the SSID.

The SDC device 140 on the mobile terminal 10 can acquire the SSID when the mobile terminal 10 enters an area that the room SDC covers. If the acquired SSID corresponds to the identifier stored in the mobile terminal, the control program in the mobile terminal 10 executes the corresponding predetermined control function.

In various examples herein, the mobile terminal 10 may be equipped with either one of or both of a Bluetooth® device (and associated interfaces and software) and a wireless LAN device (and associated interfaces and software).

In other wireless LAN examples, the control program of the mobile terminal may control the functionality of the mobile terminal without pairing or the like. In particular, an SDC device installed in a restricted area (area SDC device) may have a device name (or SSID) with specific information indicating that the area is restricted and the use of mobile terminal is limited. For example, the device name of such an area SDC device may include a specific extension such as ".NOPHONE" or ".NOPHOTO" at the end of the device name. The specific information may be a number with one or more digits (e.g., 999), or may be a part of the device name (e.g., NOPHONEAREA). In this case, the control program in the mobile terminal 10 may retrieve an entry from an initially populated list of the specific information and/or the corresponding control function. For example, the control program stores "NOPHONE" in association with the control function of "disable phone functions," and stores "NOPHOTO" in association with the control function of "disable camera functions."

Figure 9B:
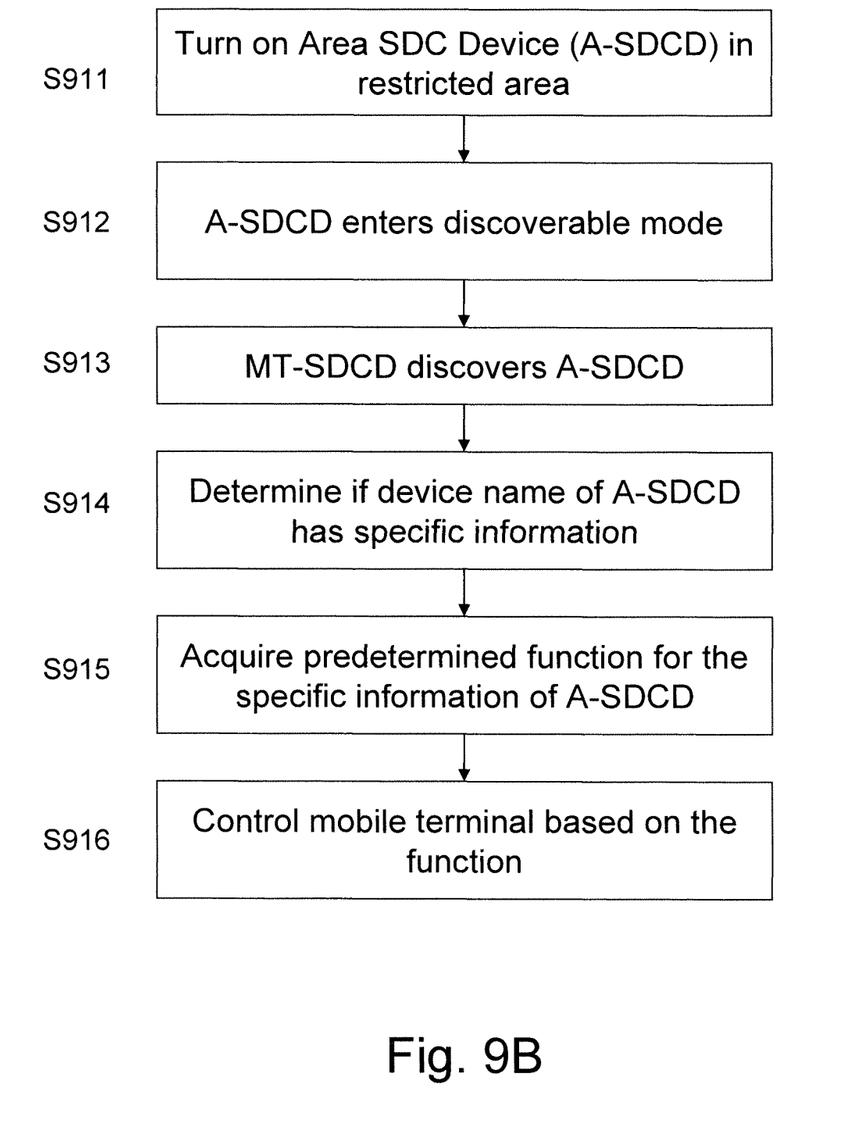
FIG. 9B shows an exemplary flow of controlling functionality of the mobile terminal based on the identifier of an SDC device.

FIG. 9B shows an exemplary flow of controlling functionality of the mobile terminal 10 as above. As in previous examples, the SDC devices are described here as Bluetooth® devices, although the SDC devices may be other wireless communication devices, such as wireless devices enabling local area network (LAN) communications. An administrator of the restricted area, for example, an airport security checkpoint area, may install and turn on an area SDC device having a device name of, for example, "AIRPORT_SECURITY.NO-PHOTO," in the airport security check point area (S911). The area SDC device enters a "discoverable" mode (S912) automatically or manually.

A passenger who carries the mobile terminal with the control program running thereon enters the security check point area. Upon entering the security check point area, the SDC device 140 of the mobile terminal 10 "discovers" the area SDC device in the security check point (S913).

At this time, the SDC device 140 determines whether or not the device name of the discovered area SDC device contains the specific information (S914). As the SDC device 140 finds that the discovered area SDC device has the extension ".NOPHOTO," the control program on the mobile terminal 10 ascertains the predetermined control function for the extension ".NOPHOTO" (S915) and executes the predetermined control function, restricting the functionality of the mobile terminal 10 (S916) accordingly. In this example, the control program disables the camera functions (e.g., for taking a picture or a movie) of the mobile terminal 10. At the same time, the mobile terminal 10 may display on the screen 200 information notifying a user that the camera functions are disabled because of the restriction.

Accordingly, the functionality of the mobile terminal in which the control program is operating may be limited by associating the specific information (e.g., for the airport security checkpoint SDC device) with control functions of the mobile terminal. Thus, the passengers who are not aware that the use of camera is restricted in the security check point may be able to be automatically prevented from using their cameras.

As noted above, although the above example focused on an airport security checkpoint, similar functionality may be provided in other restricted areas. For example, an administrator or manager of courts or hospitals may install an SDC device with the device name including the specific information, e.g., ".COURT" or ".HOSPITAL," respectively. The control program of the mobile terminal may store the corresponding function for the specific information, e.g., "disable phone functions" for both of ".COURT" or ".HOSPITAL."

If the DSC device 140 in the mobile terminal 10 finds multiple SDC devices in which at least some have specific information and different associated control functions, the control function may be selected in a predetermined manner. For example, the most restrictive control function among the SDC devices or the control function associated with the SDC device that has been paired may be applied. In an alternative, the control program may have a table as shown in FIG. 8 in which an order of application (i.e., priority) of the control function or SDC device is defined. According to FIG. 8, when the SDC 140 of the mobile terminal finds both room SDC devices 340 and 345 (both room SDC devices 340 and 345 are turned on), the control function assigned to room SDC device 345 (ROOM01-02) is executed.

Thus, the ability to control functionality of the mobile terminal by suppressing certain functions (sound/vibration/camera) of the mobile terminal may be triggered by an operating control program in the mobile terminal discovering or connecting to a specific external SDC device. The control function associated with the SDC device is selected and associated with information of a particular SDC device identifier (device name/SSID and/or specific information in the SDC device identifier), either initially predetermined or manually by the user, to register the SDC device. One or more control functions that restrict the functionality of the mobile terminal are automatically triggered at the mobile terminal by the control program as a result of discovery of or connection to an SDC device whose identifier is registered or whose specific information matches a predetermined characteristic.

In the present disclosure, all or a part of the functions or operations of the unit, device, systems or servers can be implemented as software. In such a case, the software is recorded on one or more non-transitory recording media such as a ROM, a flash memory, an optical disk or a hard disk drive; and when the software is executed by a processor, the software causes the processor together with peripheral devices to execute the functions, for example, the functions as set forth above, specified in the software. For example, a medium may store a program that configures a mobile terminal to control a terminal function based on a device name acquired from an external SDC device, in any of the ways mentioned above. A system or apparatus may include one or more such non-transitory recording media on which the software is recorded and a processor together with necessary hardware devices such as an interface.

Although certain specific examples have been disclosed, it is noted that the present teachings may be embodied in other forms without departing from the spirit or essential characteristics thereof. The present examples described above are considered in all respects as illustrative and not restrictive. The patent scope is indicated by the appended claims, and all changes that come within the meaning and range of equivalency of the claims are therefore intended to be embraced therein.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer readable recording medium storing a program, the program, when executed by a processor of a mobile terminal that includes a wireless communication interface and an internal short-distance-communication (SDC) device, configures the mobile terminal to perform functions including functions to:
   acquire a device identifier of an external SDC device located outside of the mobile terminal, the device identifier being assigned to the external SDC;
   determine whether information of the received device identifier corresponds to an identifier or specific information stored in the mobile terminal;
   in response to determining that the information of the received device identifier corresponds to the stored identifier or specific information, ascertain a control function associated with the stored device identifier or specific information; and
   in response to ascertaining the control function, execute the control function to limit functionality of the mobile terminal, wherein the functionality of the mobile terminal is limited without receiving a control signal from the external SDC device to limit the functionality of the mobile terminal.

2. The non-transitory computer readable recording medium of claim 1, wherein in response to executing the control function, the program configures the mobile terminal to disable at least one of voice or data communications of the mobile terminal.

3. The non-transitory computer readable recording medium of claim 1, wherein in response to executing the control function, the program configures the mobile terminal to suppress audible acknowledgement by the mobile terminal of receipt of a communication.

4. The non-transitory computer readable recording medium of claim 3, wherein in response to receipt of the communication, the program further configures the mobile terminal to send a message to an originator of the communication.

5. The non-transitory computer readable recording medium of claim 1, wherein in response to executing the control function, the program configures the mobile terminal to disable a camera of the mobile terminal.

6. The non-transitory computer readable recording medium of claim 1, wherein the program further causes the processor to configure the mobile terminal, before the acquiring of the device identifier of the external SDC device, to perform functions to:
   pair with the external SDC device including to receive a device name of the external SDC device;
   receive a manually-provided selection of one of a plurality of control functions to limit functionality of the mobile terminal;
   associate the selected control function with the device identifier or specific information; and
   store, in the mobile terminal, the device name as the device identifier or specific information and the associated selected control function.

7. The non-transitory computer readable recording medium of claim 1, wherein:
   the program stores multiple control functions associated with different device identifiers or specific information, and
   when device identifiers of two or more external SDC devices are found concurrently, the program configures the mobile terminal to select one of the control functions associated with the SDC devices in a predetermined manner and execute the one of the control functions.

8. The non-transitory computer-readable recording medium of claim 1, wherein and the program configures the mobile terminal to acquire the device identifier of the external SDC device without establishing a pairing between the internal and external SDC devices.

9. A method for controlling functionality of a mobile terminal that includes a wireless communication interface and an internal short-distance-communication (SDC) device, the method comprising:
   acquiring a device identifier of an external SDC device located outside of the mobile terminal, the device identifier being assigned to the external SDC;
   determining whether information of the received device identifier corresponds to an identifier or specific information stored in the mobile terminal;
   in response to determining that the information of the received device identifier corresponds to the stored identifier or specific information, ascertaining a control function associated with the stored device identifier or specific information; and
   in response to ascertaining the control function, executing the control function to limit functionality of the mobile terminal, wherein the functionality of the mobile terminal is limited without receiving a control signal from the external SDC device to limit the functionality of the mobile terminal.

10. The method of claim 9, further comprising, in response to executing the control function, disabling at least one of voice or data communications of the mobile terminal.

11. The method of claim 9, further comprising, in response to executing the control function, suppressing audible acknowledgement by the mobile terminal of receipt of a communication.

12. The method of claim 11, further comprising, in response to receipt of the communication, configuring the mobile terminal to send a message to an originator of the communication.

13. The method of claim 9, further comprising, in response to executing the control function, disabling a camera of the mobile terminal.

14. The method of claim 9, further comprising, before the acquiring of the device identifier of the external SDC device:
   pairing with the external SDC device including receiving a device name of the external SDC device;

receiving a selection of one of a plurality of control functions to limit functionality of the mobile terminal;

associating the selected control function with the device identifier or specific information; and storing, in the mobile terminal, the device name as the device identifier or specific information and the associated selected control function.

15. The method of claim 9, wherein the external SDC device is located in a vehicle.

16. The method of claim 9, wherein the external SDC device is located in a non-mobile area where the functionality of the mobile terminal is restricted.

17. The method of claim 9, wherein:

the mobile terminal stores multiple control functions associated with different stored device identifiers or specific information, and when device identifiers of two or more external SDC devices are found concurrently and corresponding functions are ascertained, the mobile terminal selects one of the control functions associated with the SDC devices in a predetermined manner and executes the one control function.

18. The method of claim 9, wherein the acquiring step acquires the device identifier of the external SDC device without establishing a pairing between the internal and external SDC devices.

19. A mobile terminal, comprising:

one or more processors;

a non-transitory storage medium storing a program;

a wireless interface for a phone function and a data communication function; and an internal short-distance-communication (SDC) device, wherein:

the program, when executed by the one or more of the processors, configures the mobile terminal to perform functions including functions to:

acquire a device identifier of an external SDC device located outside of the mobile terminal, the device identifier being assigned to the external SDC;

determine whether information of the received device identifier corresponds to an identifier or specific information stored in the mobile terminal;

in response to determining that the information of the received device identifier corresponds to the stored identifier or specific information, ascertain a control function associated with the stored device identifier or specific information; and in response to ascertaining the control function, execute the control function to limit functionality of the mobile terminal, wherein the functionality of the mobile terminal is limited without receiving a control signal from the external SDC device to limit the functionality of the mobile terminal.

20. The mobile terminal of claim 19, wherein in response to executing the control function, the program configures the mobile terminal to disable voice or data communications of the mobile terminal.

21. The mobile terminal of claim 19, wherein in response to executing the control function, the program configures the mobile terminal to suppress audible acknowledgement by the mobile terminal of receipt of a communication.

22. The mobile terminal of claim 21, wherein in response to receipt of the communication, the program further configures the mobile terminal to send a message to an originator of the communication.

23. The mobile terminal of claim 19, further comprising a camera, wherein in response to executing the control function, the program configures the mobile terminal to disable a camera functionality of the mobile terminal.

24. The mobile terminal of claim 19, wherein the program further causes the processor to configure the mobile terminal, before the acquiring of the device identifier of the external SDC device, to perform functions to:

pair with the external SDC device including to receive a device name of the external SDC device;

receive a manually-provided selection of one of a plurality of control functions to limit functionality of the mobile terminal;

associate the selected control function with the device identifier or specific information; and store, in the mobile terminal, the device name as the device identifier or specific information and the associated selected control function.

25. The mobile terminal of claim 19, wherein:

the program stores multiple control functions associated with different stored device identifiers or specific information, when device identifiers of two or more external SDC devices are found concurrently, the program selects one of the control functions associated with the SDC devices in a predetermined manner and executes the one control function.

26. The mobile terminal of claim 19, wherein the program configures the mobile terminal to acquire the device identifier of the external SDC device without establishing a pairing between the internal and external SDC devices.

* * * * *